United States Patent [19]

Mullally

[11] Patent Number: 5,711,344

[45] Date of Patent: Jan. 27, 1998

[54] ELECTROMECHANICAL FLUID CONTROL VALVE WITH SPIRAL CENTERING MEMBER FOR VALVE ACTUATING PIN

[75] Inventor: Charles J. Mullally, Muskegon, Mich.

[73] Assignee: Saturn Electronics & Engineering, Inc., Coopersville, Mich.

[21] Appl. No.: 702,050

[22] Filed: Aug. 23, 1996

[51] Int. Cl.⁶ .................. F15B 13/044; F16K 31/06; F16K 1/14
[52] U.S. Cl. .................. 137/596.17; 251/129.14
[58] Field of Search .................. 137/596.17; 251/126, 251/129.14

[56] References Cited

U.S. PATENT DOCUMENTS 3,820,757  6/1974  Siebel ................... 251/129.21
4,610,267  9/1986  Beck et al. .
4,998,559  3/1991  McAuliffe ................... 251/129.14 X

*Primary Examiner*—Gerald A. Michalsky
*Attorney, Agent, or Firm*—Edward J. Timmer

[57] ABSTRACT

An electromechanical fluid control valve includes a solenoid-actuated actuating pin in a fluid passage for actuating a fluid control valve, and a spiral locating member for centering the actuating pin coaxially relative to the armature and fluid control valve. The spiral locating member may comprise a wire wound helically about the actuating pin along a portion of its length. The actuating pin is guided for movement by an inner surface of the spiral pin locating member. An outer surface of the spiral pin locating member is supported in a fluid passage of the valve to center the locating member therein between the armature and fluid control valve.

11 Claims, 2 Drawing Sheets

ELECTROMECHANICAL FLUID CONTROL VALVE WITH SPIRAL CENTERING MEMBER FOR VALVE ACTUATING PIN

FIELD OF THE INVENTION

The present invention relates to electromechanical fluid control valves and, more particularly, to electromechanical fluid control valves having an actuating pin positioned between a solenoid armature and fluid valve by a spiral pin locating member.

BACKGROUND OF THE INVENTION

Electrohydraulic fluid control valves are known that include a solenoid having an armature or plunger adapted to move an actuating pin that, in turn, seats/unseats one or more ball valves for controlling fluid flow between a supply port and one or more fluid control ports. In the past, the actuating pin has been retained between the solenoid armature or plunger and a ball valve by a retainer member fixedly disposed in a fluid passage of the valve. The retainer member includes a cylindrical bore in which the actuating pin is received for sliding movement relative to the ball valve in response to energization of the solenoid. Use of such a retaining member in such a way has been disadvantageous in that the retainer member requires precision machining, oftentimes is incapable of properly centering the actuating pin relative to the armature and ball valve, and substantially blocks fluid flow in the fluid passage, especially in extremely small size fluid passages, of certain electromechanical fluid control valves.

An object of the present invention is to provide an electromechanical fluid control valve having an actuating pin locating member that overcomes the disadvantages of the retainer member described hereabove.

SUMMARY OF THE INVENTION

The present invention provides an electromechanical fluid control valve having an actuating pin, such as a solenoid-actuated pin, in a fluid passage for actuating a fluid valve in response to movement of the armature to control fluid flow to the passage, and a pin locating member in the fluid passage that properly positions the actuating pin relative to the fluid valve and that overcomes the disadvantages of the retainer member described hereabove.

An embodiment of the present invention involves a pin locating member comprising a spiral member disposed about the actuating pin in the fluid passage and having a spiral axis substantially coaxial with the longitudinal axis of the actuating pin. The actuating pin is guided for movement by an inner surface of the spiral member. An outer surface of the spiral locating member can be engaged by a wall of the fluid passage to center the member therein.

The spiral locating member resembles in configuration a coil spring that is not subjected to axial forces. It therefore may be made from a variety of materials including, but not limited to, high or low tensile steels, copper, brass, aluminum, plastic or other materials. For example, the spiral material may comprise a cylindrical steel wire disposed helically about the actuating pin along a portion of its length. A typical helical wire is wound at least 1 complete turn about the actuating pin with a pitch of the spiral or helix determined by the number of wire turns and the length of the actuating pin.

The spiral locating member alternately may be prewound, premolded or otherwise preformed to a helical configuration and disposed about the actuating pin.

The spiral pin locating member is advantageous in that it improves centering of the actuating pin while providing a relatively unobstructed fluid flow path in the fluid passage as a result of the spiral nature of the locating member. That is, the spiral configuration of the pin locating member allows fluid to readily flow along the spiral path with reduced obstruction. Moreover, the spiral pin locating member can be wound as a wire about the actuating pin prior to assembly of the actuating pin in the valve so as to faciltiate valve assembly. The spiral member may be wound to a helical configuration on conventional spring winding equipment.

The spiral pin locating member can be used in electromechanical fluid control valves of various types, such as electrohydraulic, electropneumatic and others, that are used to control fluid flow.

These and other advantages and objects of the present invention will become more readily apparent from the following detailed description taken with the following drawings.

DESCRIPTION OF THE INVENTION

Figure 2:
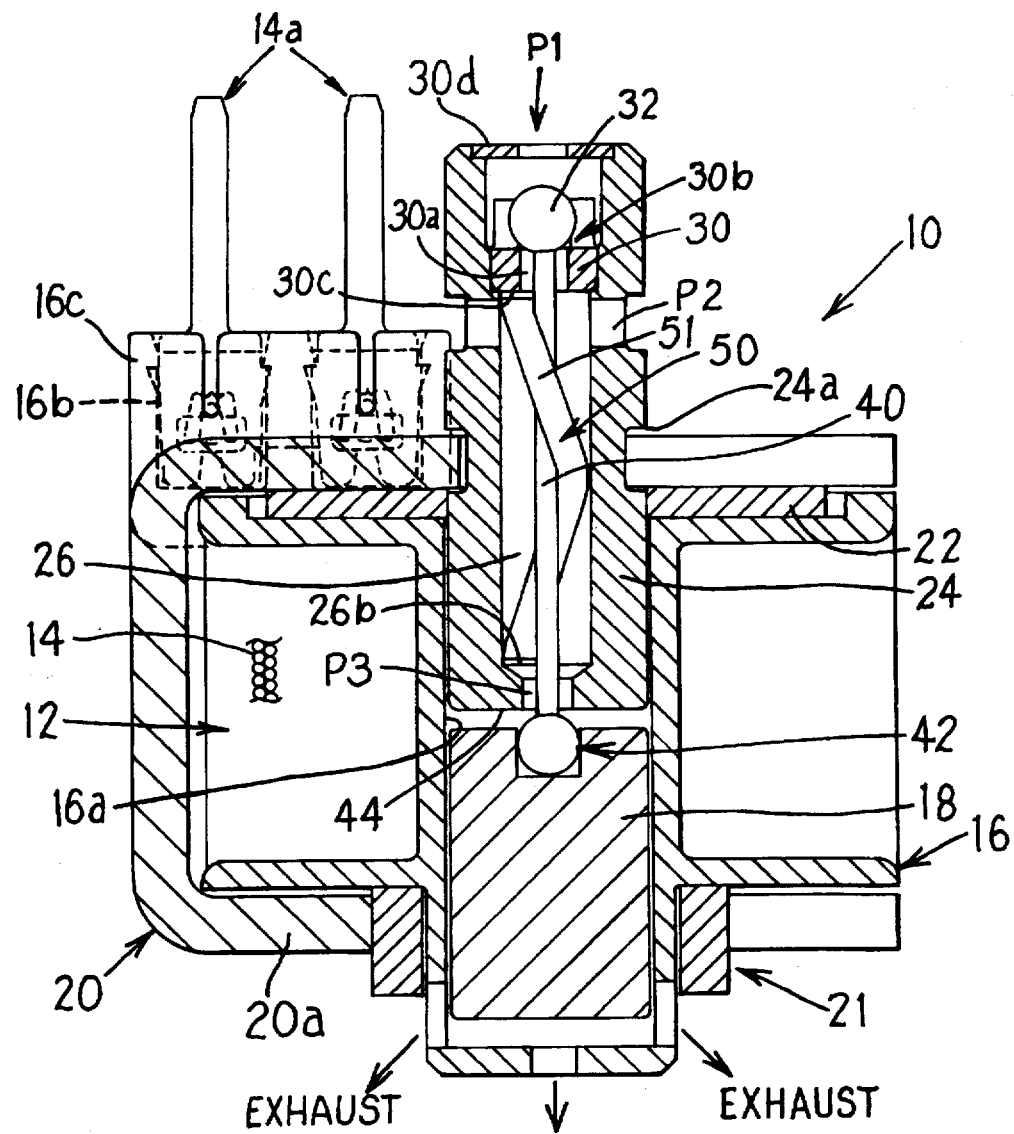
FIG. 2 is a longitudinal sectional view of the three-way electrohydraulic control valve of FIG. 1.
Figure 1:
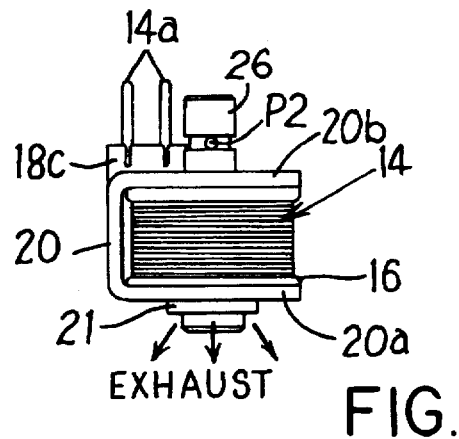
FIG. 1 is a side elevational view of a three-way electrohydraulic fluid control valve pursuant to an embodiment of the invention.
Figure 3:
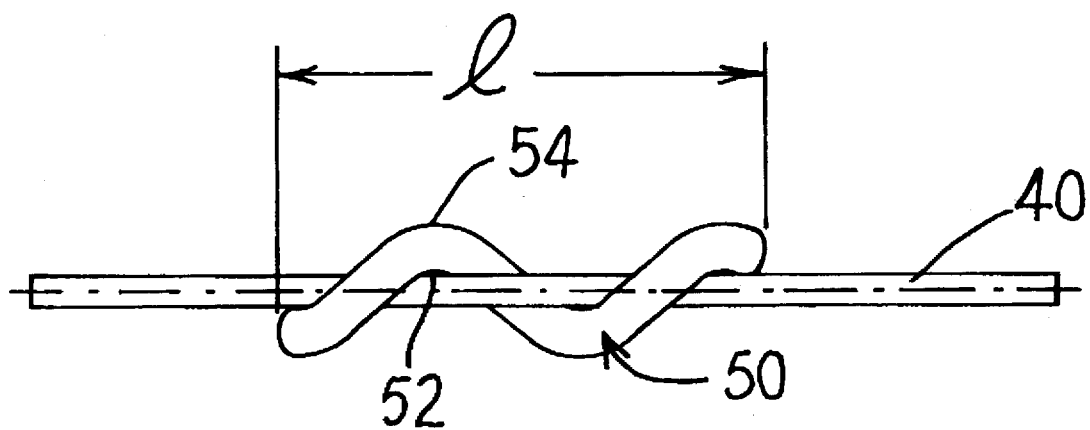
FIG. 3 is a side elevational view of an actuating pin having a spiral locating wire wound about the pin.

Referring to FIGS. 1-3, a three-way, normally closed electrohydraulic fluid control valve 10 is shown for purposes of illustrating the present invention and not limiting the invention. The invention is not limited to the particular fluid control valve illustrated and can be practiced in conjunction with other configurations of electrohydraulic control valves as well as electropneumatic and other types of fluid control valves. The invention can be practiced as well with such electromechanical fluid control valves as pulse width modulated fluid control valves, on/off fluid control solenoid valves, and fluid pressure control solenoid valves.

Referring to FIGS. 1-2, the three-way, normally closed electrohydraulic fluid control valve 10 is illustrated including a conventional solenoid 12 having a solenoid coil 14 (partially shown) comprising copper wire wound on a plastic or other electrical insulating bobbin 16 and an armature or plunger 18 disposed for sliding movement within a cylindrical longitudinal bore 16a of the bobbin 16 in response to energization of the coil 14. The coil 14 receives electrical signals via electrical terminals 14a located in recesses 16b of an extension 16c of the bobbin 16 so as to contact the coil wires.

The bobbin 16 is postioned on a steel frame 20. In particular, the bobbin 16 is retained on the frame 20 by a steel magnetic flux ring 21 disposed on a first end flange 20a of the frame 20 and also by a steel tubular pole piece 24 disposed on a second end flange 20b of the frame 20 as shown.

An optional steel flux washer 22 is shown disposed on the pole piece 24 proximate the second end flange 20b to concentrate magnetic flux at the magnetic pole piece 24. The pole piece 24 is received in the cylindrical longitudinal bore 16a of the bobbin 16 and is retained therein by the second end frame flange 20b being received in an outer groove 24a of the pole piece as shown.

The pole piece 24 includes an inner cylindrical, longitudinal fluid passage or bore 26. The passage 26 includes a first end port P1 communicated to pressurized supply fluid, such as automatic transmission fluid. The port P1 may include an optional filtering screen (not shown). The passage 26 also includes a pair of control ports P2 that are communicated to a device to be supplied with regulated fluid pressure, such as for example a spool valve (not shown) of an automobile transmission hydraulic shift mechanism. The passage 26 further includes a second end port P3 that constitutes a discharge or exhaust port communicated to a hydraulic return or sump (not shown). Fluid discharged from the port P3 flows in the space or gap between the armature or plunger 18 and the adjacent bobbin wall to the return or sump via the openings or passages (Exhaust arrows) in the bobbin 16 shown. A valve seat 30 with fluid aperture 30a and a ball valve 32 are disposed in the pole piece passage 26 proximate the supply port P1. In particular, the valve seat 30 is press fit in the passage 26 between the supply port P1 and the control ports P2. The valve seat includes a cage 30b and pressed-in end cap 30d between which the ball valve 32 is disposed for movement relative to the valve seat for controlling fluid flow from the supply port P1 to the control ports P2. The ball valve 32 is actuated to move relative to the seat 30 by movment of cylindrical actuating pin 40 disposed in the fluid passage 26.

The actuating pin 40 is disposed between the ball valve 32 and a ball valve 42 press fit or otherwise fixedly secured in a recess in the end of the armature 18 as shown to cooperate with valve seat 44 associated with the discharge port P3 of the pole piece 24. The ball valve 42 and seat 44 cooperate to control fluid discharge from the fluid passage 26. Movement of the armature 18 toward/away from the pole piece 24 results in movement of the ball valve 42 and the actuating pin 40 toward/away from the ball valve 32 in a manner to control (increase/decrease) fluid flow from the supply port P1 to the control ports P2 as determined by the position of the ball valve 32 relative to the seat 30. The electrical current supplied to the coil 14 determines the distance that the armature 18 moves and thus the position of the ball valve 32 relative to the seat 30. A fully closed position of ball valve 32 relative to valve seat 30 is shown in FIG. 2.

Movement of armature 18 toward/away from the Pole piece 24 also varies the position of the ball valve 42 relative to valve seat 44 to control fluid discharge from port P3. In FIG. 2, the ball valve 42 is shown fully open to communicate port P3 to return or sump when the ball valve 32 is closed relative to seat 30.

In accordance with an embodiment of the present invention, a spiral pin locating member 50 is disposed in the fluid passage 26 for positioning the actuating pin 40 relative to the armature 18 and fluid control ball valves 32,42. The pin locating member 50 comprises a spiral wire member 51 disposed about the actuating pin 40 with a spiral axis substantially coaxial with a longitudinal axis of the actuating pin 40. The spiral member 50 includes an inner surface 52, FIG. 3, for generally defining an inner diameter for guiding movment of the actuating pin 40 relative to the ball valves 32, 42 so that the longitudinal axis of the actuating pin 40 is centered or coaxial with the diametral axis of the ball valve 32. In this way, the ball valve 32 is unseated by a force centered on or aligned with the diametral ball valve axis, thereby avoiding off-axis ball valve unseating forces.

The spiral member 50 includes an outer surface 54, FIG. 3, for engaging the inner wall of the pole piece that defines the fluid passage 26. In effect, the outer surface 54 of the spiral member 50 defines an outer diameter to center the spiral member 50 in the fluid passage 26. Thus, the spiral locating member 50 and the actuating pin 40 are centered in the passage 26 relative to ball valves 32, 42.

The spiral locating member 50 preferably comprises a helical wire disposed coaxially about the actuating pin 40 along a portion of its length. Generally, the helical wire is wound at least 1 complete turn about the actuating pin 40. The inner diameter of the spiral or helical wire 50 (which guides the actuating pin 40) and the wire cross-sectional diameter are the most important dimensions to achieve satisfactory positioning of the actuating pin 40. For purposes of illustration only, a steel wire having a cross-sectional diameter of 0.050 inch and wound to have an inner helix diameter of 0.030 inch, outer helix diameter of 0.130 inch, and length 1 of 0.500 inches can be used for an actuating pin 40 having an outer diameter of 0.029 inch and a fluid passage 26 having an inner diameter of 0.131 inch and distance of 0.520 inch between the inner surface 30c of the valve seat 30 and the tapered surface 26b of the fluid passage 26, FIG. 2.

The overall length of the spiral or helical wire 50 is relatively less important because some end clearance thereof relative to the valve seat inner surface 30c and tapered passage surface 26b is permissible as shown in FIG. 2.

The pitch of the spiral or helical wire 50 is important because the actuating pin 40 is aligned and centered by the spiral member. A miniumum of one complete turn generally is used to provide stability and support of the pin 40. Typically, 1.25 turns of the wire 50 about the actuating pin 40 provide consistent and reliable support of the actuating pin 40 in the fluid passage 26. However, more than two turns of wire 50 about the actuating pin 40 begins to significantly restrict fluid flow capability in certain critical applications such as high flow pulse width modulated solenoid valves. Typically, the pitch of the spiral or helix will be defined preferably to provide approximately 1.5 turns of wire in the overall wire length available. In some applications where a greater actuating pin length is available, it may possible to use more than two turns of spiral wire 50 about the actuating pin 40 in the practice of the invention.

Referring to FIG. 3, the wire 50 is shown coaxially disposed about the actuating pin 40. Although the ends of the spiral or helical wire 50 are shown oriented perpendicular to the axis of the wire, the wire ends can be oriented otherwise, such as parallel to one another and perpendicular to the wire spacer axis, by using suitable abrasive cut-off techiques to cut the wire after winding.

The spiral pin locating member of the present invention is advantageous in that it provides improved centering of the actuating pin with a relatively unobstructed fluid flow path in the fluid passage as a result of the spiral nature of the locating member. That is, the spiral configuration of the pin locating member allows fluid to readily flow along the spiral path with reduced obstruction. Moreover, the spiral pin locating member can be wound as a wire about the actuating pin. The wire also can be prewound or otherwise formed to helical configuration and then placed over or around the actuating pin prior to assembly of the actuating pin in the valve so as to faciltiate valve assembly.

Although the present invention has been described with respect to certain embodiments thereof, the invention is not intended to be limited thereto and various modifications, changes and omissions can be made therein within the scope of the invention as set forth in the appended claims.

I claim:

1. In an electromechanical fluid control valve, an actuating pin in a fluid passage for actuating a fluid control valve and a pin locating member for positioning said actuating pin relative to said fluid control valve, said pin locating member comprising a spiral member disposed about said actuating pin in a manner that said spiral member is not subjected to axial forces and with a spiral axis substantially coaxial with a longitudinal axis of said actuating pin, said spiral member defining a spiral fluid flow path about said actuating pin and having a spiral surface for guiding movement of the actuating pin relative to said fluid control valve.

2. The valve of claim 1 wherein said spiral member includes an outer surface for engaging a wall of said fluid passage to center said spiral member therein.

3. The valve of claim 1 wherein said spiral member comprises a helical wire wound about the actuating pin along a portion of its length.

4. The valve of claim 3 wherein said helical wire is wound at least 1 complete turn about the actuating pin and not exceeding 2 turns about the actuating pin.

5. The valve of claim 1 including a hydraulic supply port communicated to said fluid passage.

6. The valve of claim 1 including a pneumatic supply port communicated to said fluid passage.

7. In an electromechanical fluid control valve, a solenoid armature, an actuating pin disposed in a fluid passage for actuating a fluid control valve, said armature having a ball valve thereon proximate a first end of said actuating pin, said fluid control valve comprising a ball valve disposed on a valve seat proximate a second end of said actuating pin, and a pin locating member for positioning said actuating pin relative to said fluid control valve, said pin locating member comprising a spiral member disposed about said actuating pin with a spiral axis substantially coaxial with a longitudinal axis of said actuating pin.

8. The valve of claim 7 wherein said spiral member is disposed between said ball valves.

9. The valve of claim 7 wherein said spiral member is disposed between a shoulder of a tubular pole piece and said valve seat.

10. The valve of claim 7 wherein said ball valve proximate said first end is a fluid exhaust valve and said ball valve proximate said second end is a fluid supply valve, and said fluid passage is disposed therebetween to provide a fluid discharge passage.

11. In an electromechanical fluid control valve, a solenoid armature, an actuating pin disposed in a fluid passage for movement by said solenoid armature for actuating a fluid control valve, and a pin locating member for positioning said actuating pin relative to said fluid control valve, said pin locating member comprising a spiral member disposed about said actuating pin without connection thereto, said spiral member defining a spiral fluid flow path about the actuating pin and a spiral axis substantially coaxial with a longitudinal axis of said actuating pin and having an inner surface for guiding movement of the actuating pin relative to said fluid control valve.

* * * * *